United States Patent [19]

Viertel

[11] 4,364,598

[45] Dec. 21, 1982

[54] SWIVEL BEARING AND REINFORCEMENT FOR SUN VISOR

[75] Inventor: Lothar Viertel, Saarlouis, Fed. Rep. of Germany

[73] Assignee: Gebr. Happich GmbH, Fed. Rep. of Germany

[21] Appl. No.: 238,576

[22] Filed: Feb. 26, 1981

[30] Foreign Application Priority Data

Mar. 26, 1980 [DE] Fed. Rep. of Germany ....... 3011639

[51] Int. Cl.³ ............................................... B60J 3/02
[52] U.S. Cl. .................................................. 296/97 K
[58] Field of Search ................. 296/97 K, 97 H, 97 R

[56] References Cited

U.S. PATENT DOCUMENTS

| | | | |
|---|---|---|---|
| 2,456,484 | 12/1948 | Bell | 296/97 K |
| 3,330,594 | 7/1967 | Cadle | 296/97 R |
| 3,463,435 | 8/1969 | McGrew | 296/97 R |
| 3,825,296 | 7/1974 | Peterson | 296/97 K |

Primary Examiner—Robert R. Song
Attorney, Agent, or Firm—Ostrolenk, Faber, Gerb & Soffen

[57] ABSTRACT

The disclosure concerns a sun visor for a vehicle, or the like, including a visor body which is stiffened by an embedded wire reinforcing insert. The insert is of generally U-shape, bent outwardly at its free ends to define laterally protruding bearing pins. There are two spaced apart bearing blocks supported on the vehicle and the bearing blocks have opposed end faces which are rubbingly engaged by the respective leg of the U, which resists swiveling of the visor body. Each bearing pin extends to a receptacle provided in its bearing block. One end face of a bearing block engaging one leg of the U is shaped to bias the respective leg toward the other leg of the U, which increases the resistance to swiveling of the visor body. A plastic sheath consisting of two L-shaped, hinged together halves in hingedly closed and fastened shut over each bearing pin and the adjacent section of the leg of the U.

32 Claims, 6 Drawing Figures

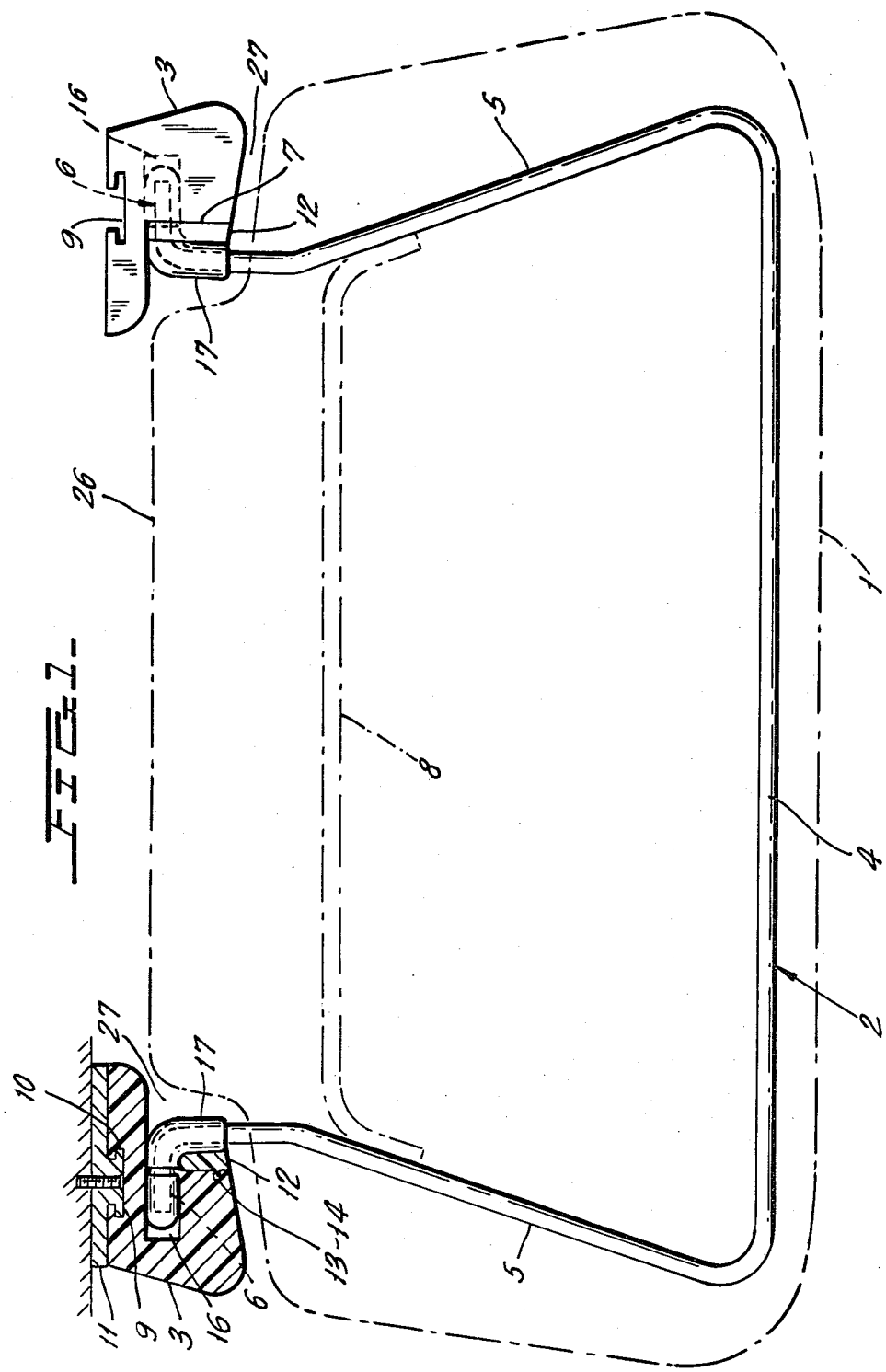

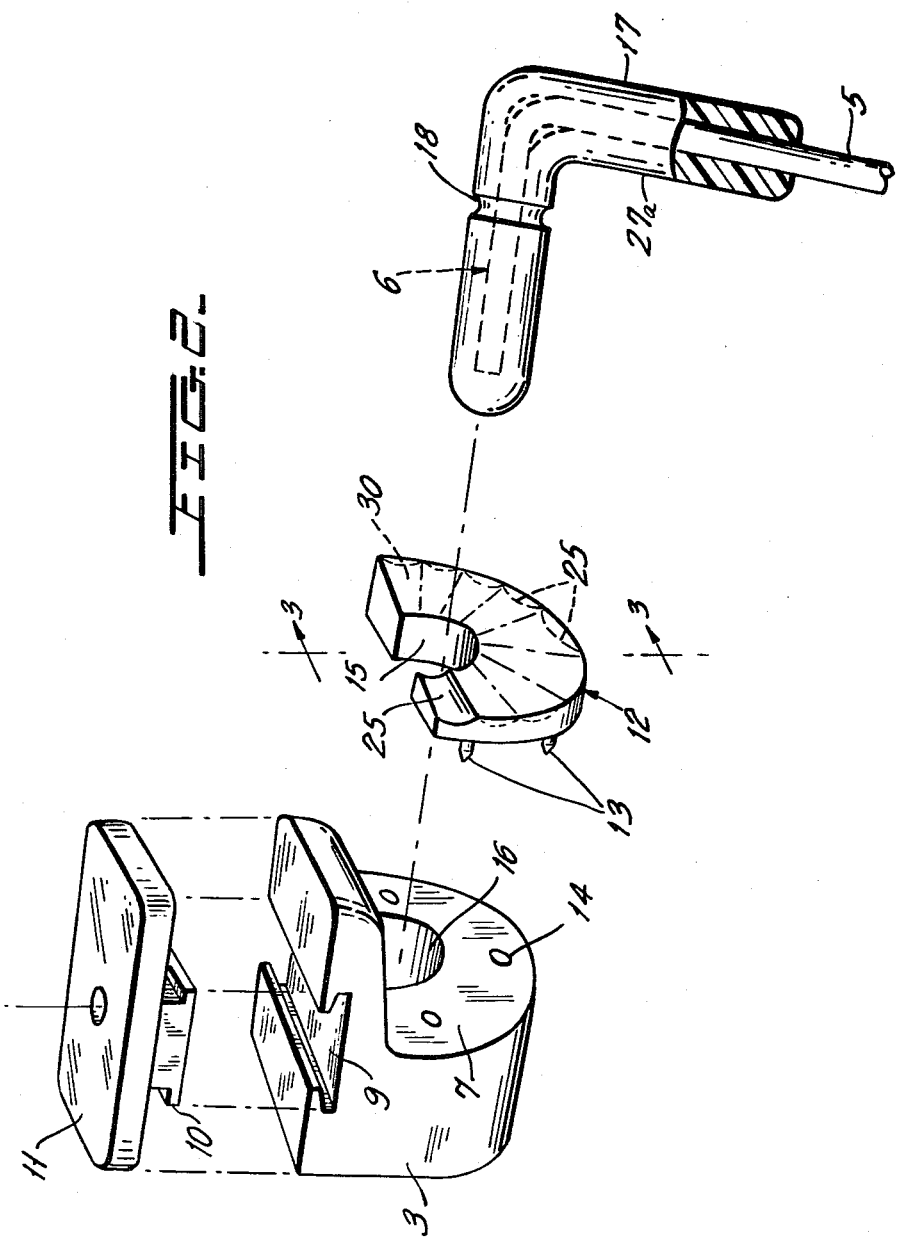

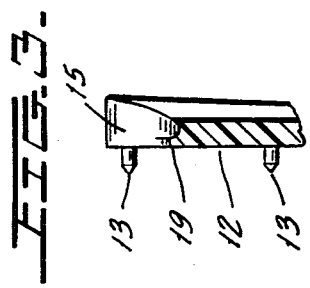
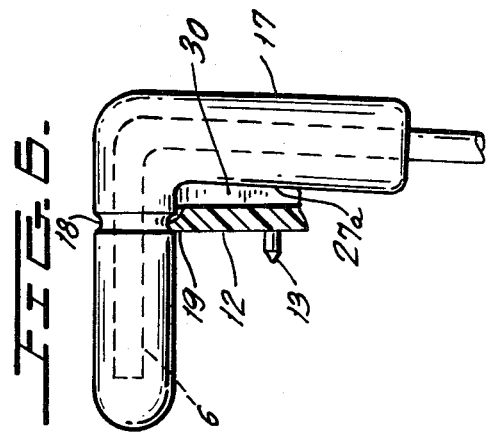
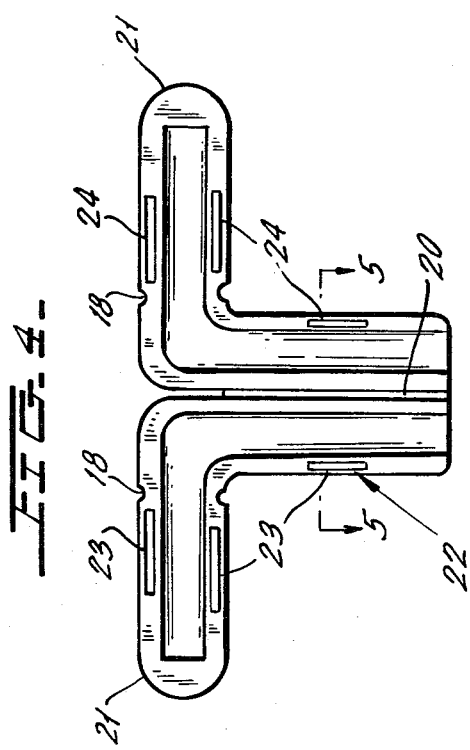
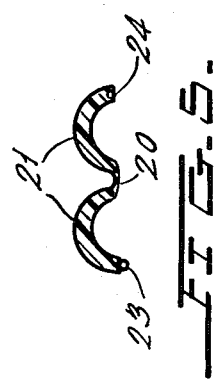

SWIVEL BEARING AND REINFORCEMENT FOR SUN VISOR

BACKGROUND OF THE INVENTION

The invention relates to a sun visor, particularly for vehicles, having a sun visor body of soft elastic pad material which is swivelably mounted between two bearing blocks and is stiffened by a wire reinforcing insert.

In one known sun visor of this type, shown in German Utility Model (Gebrauchsmuster) 1 762 383, the sun visor body is supported between two bearing blocks which permit the visor body to swivel. Each of the bearing blocks has a bearing pin. Each bearing pin engages in a pivot bearing clip which is mounted inside the sun visor body and is firmly connected with the wire insert. Through an adjusting screw passing through the legs of the pivot bearing clip, a desired swivel torque for the visor body can be selected. This sun visor is constructed from many parts. Thus, the pivot bearing clips must be manufactured in left-hand and right-hand design and must be connected with the wire insert by welding in a relatively labor-intensive manner. In addition, each pivot bearing clip must be equipped with an adjusting screw and spring nut and the screw must be adjusted exactly. This also is quite expensive. Finally, the bearing blocks have a relatively complicated configuration.

SUMMARY OF THE INVENTION

It is the object of the invention to provide a sun visor which requires few parts of a simple form and which is inexpensive to manufacture.

Another object is to simplify attaching the sun visor to the body of the vehicle.

It is a further object of the invention to effectively control swiveling of the visor body.

Yet another object of the invention is to stiffen the visor body.

A still further object is to improve the safety of the sun visor.

According to the invention, the wire reinforcing insert supported on and preferably embedded in the visor body includes bearing pins at the ends of the insert, which protrude from the sun visor body for engaging in bearing blocks on the body of the vehicle. At least one bearing pin has an angularly bent form and one bracket leg of that pin presses against the end face of the respective bearing block, under initial tension of the insert.

An advantage of the invention consists in reducing the number of separate parts previously required in making a sun visor. This in part arises from the use of the wire reinforcing insert, that is required for strengthening the visor body, for formation of the bearing pins. Furthermore, the invention takes advantage of the springiness inherent in the wire insert for producing contact force of the bearing pins pressing against the bearing blocks, so that the sun visor body will be held in a desired swivel position.

The wire insert preferably has a substantially U-shaped configuration in the plane of the visor body. The free end zones of the lateral legs of the insert are bent outwardly at an angle to form the bearing pins. This results in a very simple wire layout that sufficiently stiffens the sun visor body, because the web of the U-shaped wire insert can be readily disposed in that region of the sun visor body which is normally gripped by the user when the visor is being swiveled.

A stiffening strut may be provided to connect the lateral legs of the wire insert with one another. It is preferably spaced from the web of the U and extends approximately parallel thereto. This makes it possible to use a relatively thin wire insert. Moreover, a shorter spring arm is obtained for the lateral legs of the wire insert taking support against the end faces of the bearing blocks.

In a preferred embodiment of the invention, the wire insert comprises a bent steel wire section whose end zones protruding from the sun visor body are provided with a sheath. The sheath protects the protruding end zones against corrosion, so that an untreated inexpensive wire insert can be used. The sheath may advantageously comprise a plastic body surrounding a bearing pin as well as the lateral leg of the wire insert contiguous thereto. This makes the otherwise necessary deburring of the wire sections unnecessary, and any rattling noises in the bearing region are reliably avoided.

The plastic body of the sheath may be formed as an injection molded part comprised of two bracket halves which can be swiveled together over the end zone, can be mutually fixed through molded-on clip elements, and are connected together as one piece by a flat hinge. This injection molded part can be manufactured inexpensively and can be folded together quickly and simply about the free end zones of the wire insert and can be fixed thereon by compression of the clip elements.

In another embodiment of the invention, an annular groove is disposed in the plastic body and is intended for the snapping in of a projection defined on the bearing block. In this way, the sun visor, together with the bearing blocks, can be made up as a complete sale unit, with the bearing blocks being attached to the sun visor.

To hold the sun visor body securely in any swiveled position, at least one bearing block may have the surface thereof which abuts a leg of the U-shaped insert for driving that leg toward the other leg. The shaping causes the leg of the U to increase its initial tension when the sun visor body is swiveled from its non-use position into a glare-protection position. To make the bearing blocks as simple as possible to mold and assemble, it may be advantageous that the shaping be a beveled bearing surface connected with the bearing block. The bearing surface may be defined on a disc attached to the bearing block. This disc may be formed of plastic and may be formed with plug-in pins to be pushed into corresponding openings in the bearing block.

Additionally or alternatively to the above noted shaping, at least one bearing block may have at least one radially extending locking recess at that end face of the block that supports a leg of the insert. The recess may be arranged, for example, so that the sun visor body is secured in its swiveled, non-use position.

It improves the appearance of the sun visor if the upper edge of the sun visor body has a stepped cutout at each corner zone approximately corresponding to the dimensions of the bearing block in which the bearing block is positioned.

Other objects and features of the invention will be explained more specifically hereafter, with reference to the accompanying drawings.

BRIEF DESCRIPTION OF THE DRAWINGS

FIG. 1 shows a sun visor in front elevation view, the sun visor body being represented in dash-dot lines and one of the bearing blocks being shown in vertical section;

FIG. 2 shows a bearing zone of the sun visor according to FIG. 1, in exploded perspective view;

FIG. 3 shows a section along line III—III in FIG. 2;

FIG. 4 shows a sheath for the bearing pin of the sun visor;

FIG. 5 shows a section along line V—V in FIG. 4; and

FIG. 6 shows the bearing pin inside its closed sheath.

DESCRIPTION OF THE PREFERRED EMBODIMENT

The sun visor shown in FIG. 1 includes a flat, generally rectangular, foamed plastic material, padded sun visor body 1, represented in dash-dot lines. A wire reinforcing insert 2 is embedded in the soft visor body. The sun visor body 1 is swivelably mounted on and between two swivel bearing blocks 3. These, in turn, are to be fastened in a vehicle body above the windshield.

The wire insert 2 is substantially U-shaped. It has a web 4 which joins the two lateral legs 5. The free end zones of the lateral legs 5 are bent outwardly, at an angle to the legs 5, and form bearing pins 6 for engaging in the bearing blocks 3. The zone of each lateral leg 5 of the U that is contiguous to the bearing pin 6 thereof presses against the inwardly facing end face 7 of the bearing block 3 adjacent to it. The spacing of the blocks 3 and the shape of the insert 2 are selected so that the insert is under initial tension when the bearing blocks are mounted in the vehicle. Thus, the insert 2 is resilient with an initial outward bias of its lateral legs 5. Due to the friction force resulting from contact between the legs 5 and the bearing block end faces 7, the sun visor body 1 is retained in any swiveled position.

The wire insert 2 may be formed with a stiffening strut 8, indicated in FIG. 2 in dash-dot lines, located nearer to the bearing blocks 3 and oriented parallel to the leg 4, which connects the lateral legs 5. Strut 8 may also consist of a wire section.

The wire insert 2 may be provided on one or both sides with a covering (not shown) of cardboard, or the like, on which the soft, elastic pad layer of the visor body is applied. If desired, the entire visor body may be surrounded by an enveloping foil layer of plastic, textile, etc.

Referring to FIG. 2, each bearing block 3 is assembled via its dovetail mortise 9 with a bearing pedestal 11 having a matching tenon 10. The mortise and tenon 9, 10 are designed so that the bearing block 3 can slip off the pedestal 11 when a pushing force is exerted against the sun visor body 1. This can be of value in an accident, when a passenger hits his head against the sun visor body 1, especially if the visor body is then in an unfavorable swiveled position. In this respect, therefore, the sun visor complies more fully with safety requirements.

There is a beveled disc 12 which can be set against the end face 7 of the bearing block 3. The side of the disc opposite the bevel thereof has projecting lugs 13 and the bearing block 3 has recesses 14 starting from the end face 7 to receive the lugs. By this means, the disc 12 is anchored to the bearing block 3. The disc 12 has a bearing guideway 15 at its upper edge zone, and this is aligned with the bore 16 in the bearing block that is intended to receive the bearing pin 6. The beveled front or outward surface of the disc 12 also rises continuously off the end face 7 of the bearing block, starting from the swiveled-up non-use position of the sun visor body 1, into the swiveled-down position of use which offers glare protection. During downward swiveling of the sun visor body 1, the zone 27a of each lateral leg 5 of the wire insert 2 pressing against the beveled disc 12 abut against the bevel area 30, and the legs 5 are thus urged toward each other, so that the mutual separation of the lateral legs 5 is reduced and the friction on the opposed end faces of the bearing blocks, or of the beveled disc on at least one bearing block is corresponding increased. Alternatively or additionally, the beveled surface of the disc 12 may be formed with radially extending locking recesses, over which the lateral legs 5 can be moved in ratchet manner and into which the leg zone 27a can be caused to snap as the sun visor body 1 swivels. There is a ratchet recess 25 for securing the sun visor body 1 in its swiveled-up, non-use position. Additional ratchet recesses 25 are suggested by the dash-dot lines.

There is a bearing pin 6 on each lateral leg 5 with a directly contiguous zone 27a being formed on the lateral leg 5.

As shown in FIGS. 1, 2 and 6, the bearing pin 6 and the contiguous zone 27a of the lateral leg 5 are provided with a sheath comprised of a plastic body 17. In the zone of the bearing pin 6, the plastic body 17 has an encircling annular groove 18. This receives a projection 19 which is molded on at the bearing block 3 or at the beveled disc 12, as illustrated in FIG. 3. This holds the bearing block 3 on the bearing pin 6 after it has been plugged thereon.

The design of the plastic body 17 is shown in FIGS. 4 and 5. It is an injection molded part, having a T-shaped, open configuration when manufactured. The vertical T-leg has a weakened section running through its center, forming a flat hinge 20. Two bracket valves 21 each of semicircular cross-section and being articulated together, are formed. These can be folded together around the bearing pin end regions of the wire insert 2 quickly and simply. The closed bracket halves 21 can be fixed together, by means of molded-on clip elements 22 which, as shown in FIG. 5, may consist of a lug 23 of outwardly increasing cross-section at one bracket half 21 and an undercut groove 24 for receiving the lug 23 in the other bracket half 21.

At the corners of its upper edge 26, the sun visor body 1 has stepped offsets 27, providing spaces for receiving the bearing blocks 3.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A sun visor, including a visor body having opposite lateral edges; a reinforcing insert on the body for stiffening the body;
   bearing pins supported on the insert and located at the opposite lateral edges of the visor body; each bearing pin including a portion protruding from the visor body to engage in bearing block means associated with that bearing pin; a first leg adjacent to each bearing pin, the first leg having a side thereof which is oriented for being biased outwardly to engage that associated bearing block means.

2. The sun visor of claim 1, wherein the visor body has cutouts defined at corners thereof and the cutouts being at the locations of the first legs and the protruding portions of the bearing pins, enabling exposure of the first legs and the bearing pins.

3. The sun visor of claim 1, wherein the insert includes free end zones bent to define the protruding portions of the bearing pins.

4. The sun visor of claim 3, wherein the insert is a wire insert.

5. The sun visor of either of claims 1 or 4, wherein the insert is embedded in the visor body and the visor body is flexible, such that the embedded insert stiffens the visor body.

6. The sun visor of claim 1, further comprising a sheath over at least the protruding portion of each of the bearing pins.

7. The sun visor of claim 3, wherein the insert is substantially U-shaped, with the free end zones at which the bearing pins are defined being respectively defined by and on the legs of the insert; and the first legs being the legs of the insert.

8. The sun visor of claim 7, wherein the bearing pins are both located near a first edge of the visor body and the first edge joins the lateral edges of the visor body; the U-shaped insert including a web joining the legs of the insert and the web being located nearer than the bearing pins to a second visor body edge which is opposite the first edge thereof.

9. The sun visor of claim 8, wherein the visor body has cutouts defined at corners thereof and the cutouts being at the locations of the first legs and the protruding portions of the bearing pins, enabling exposure of the first legs and the bearing pins.

10. The sun visor of claim 8, wherein the insert is a wire insert.

11. The sun visor of either of claims 7 or 8, further comprising a stiffening strut extending between the legs of the U.

12. The sun visor of claim 11, wherein the strut is spaced from the web joining the legs of the insert and extends approximately parallel to the web of the insert.

13. The sun visor of claim 8, further comprising a sheath over at least the protruding portion of each bearing pin.

14. The sun visor of claim 13, wherein the insert is a wire insert.

15. The sun visor of claim 13, wherein the sheath also covers over the first leg adjacent the bearing pin.

16. The sun visor of claim 15, wherein the insert is embedded in the visor body and the visor body is flexible, such that the embedded insert stiffens the visor body.

17. The sun visor of claim 15, wherein the sheath comprises a body of plastic formed of two generally L-shaped halves which are hinged together along the one leg of the L that overlies the first leg adjacent the bearing pin; and the L-shaped halves being profiled such that they can be swiveled closed over the first legs of the bearing pins around the hinge connection of the halves of the sheath.

18. The sun visor of any of claims 13, 15 or 17, further comprising a groove defined in the sheath over the protruding portion of the bearing pin for receiving a projection from a bearing block.

19. The sun visor of claim 17, wherein the insert is a wire insert.

20. The sun visor of claim 17, wherein the plastic body is an integral molding including the hinge between the halves of the plastic body.

21. The sun visor of either of claims 17 or 20, further comprising clip elements molded on the plastic body for holding the halves of the plastic body together.

22. The sun visor of claim 17, further comprising a groove defined at the protruding portion of the bearing pin for receiving a projection from a bearing block.

23. In combination, the sun visor of any of claims 1, 8 or 17 and two bearing blocks for being attached to the body of a vehicle, or the like, in which the sun visor is positioned; the bearing blocks being spaced apart and being placed and shaped for engaging a respective one of the bearing pins; and each bearing block supporting an end face for engaging the side of the first leg of the respective bearing pin.

24. The combination of claim 23, wherein the visor body includes cutouts defined at corner zones thereof and the corner zones are also the locations of the bearing blocks and of the protruding portions of the bearing pins and of the first legs, enabling exposure of the bearing pins for engagement with the bearing blocks.

25. The combination of claim 23, further comprising a shaped surface at and defining at least one bearing block end face, and the shaped surface being the surface that is engaged by the respective first leg; the shaping of the shaped surface including that surface being shaped for driving the respective first leg toward the other bearing pin upon swiveling of the visor body about the bearing pins in one direction, and vice versa for reverse direction swiveling.

26. The combination of claim 25, wherein the shaped surface is beveled.

27. The combination of claim 26, wherein the shaping for driving the respective first leg toward the other bearing pin comprises the shaped surface rising a greater distance toward the opposed end face in one direction moving around the shaped surface.

28. The combination of claim 25, wherein the shaping for driving the respective first leg toward the other bearing pin comprises the shaped surface rising a greater distance toward the opposed end face in one direction moving around the shaped surface.

29. The combination of claim 25, wherein the shaped surface is defined on a disc which is non-rotatably connected with the respective bearing block.

30. The combination of claim 25, wherein the at least one end face includes at least one locking recess therein for engaging the first leg for retaining the visor body at the particular swivel orientation at which the first leg is engaged in the locking recess.

31. The combination of claim 23, wherein at least one end face includes at least one locking recess therein for engaging the first leg for retaining the visor body at the particular swivel orientation at which the first leg is engaged in the locking recess.

32. In combination, the sun visor of claim 18 and two bearing blocks for being attached to the body of a vehicle, or the like, in which the sun visor is positioned; the bearing blocks being spaced apart and being placed and shaped for engaging a respective one of the bearing pins; and each bearing block supporting an end face engaging the side of the first leg portion of the respective bearing pin; each bearing block also including a receptacle for the sheathed first leg portion of the bearing pin; and the bearing block receptacle including a projection for engaging in the groove of the sheath of the bearing pin received in the receptacle.

* * * * *